US008169647B2

(12) United States Patent
Kondo

(10) Patent No.: US 8,169,647 B2
(45) Date of Patent: May 1, 2012

(54) AUTHENTICATION TECHNIQUE THAT CAN SIMPLIFY WORKS NECESSARY WHEN THE PRINTER POSITION IS CHANGED, PERSONNEL ALLOCATION IS CHANGED, OR A NEW PRINTER IS INSTALLED

(75) Inventor: Katsuyoshi Kondo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 789 days.

(21) Appl. No.: 12/230,059

(22) Filed: Aug. 22, 2008

(65) Prior Publication Data

US 2009/0051956 A1 Feb. 26, 2009

(30) Foreign Application Priority Data

Aug. 24, 2007 (JP) .................................. 2007-218958

(51) Int. Cl.
*G06F 3/12* (2006.01)
(52) U.S. Cl. ..... 358/1.15; 713/186; 235/380; 235/382.5; 235/462.46; 709/218; 709/249; 709/250
(58) Field of Classification Search ................. 358/1.14, 358/1.15
See application file for complete search history.

(56) References Cited

U.S. PATENT DOCUMENTS

| 5,757,916 | A  | * | 5/1998  | MacDoran et al. | ........... 380/258 |
| 6,996,611 | B1 | * | 2/2006  | Muto | ............................. 709/223 |
| 7,256,900 | B1 |   | 8/2007  | Hanaoka | |
| 7,847,958 | B2 | * | 12/2010 | Ishikura | ....................... 358/1.14 |
| 2001/0046067 | A1 |   | 11/2001 | Taniguchi | |
| 2004/0054962 | A1 |   | 3/2004  | Shima et al. | |
| 2006/0251048 | A1 | * | 11/2006 | Yoshino et al. | ................ 370/351 |
| 2006/0287976 | A1 | * | 12/2006 | Sakata | ............................... 707/1 |
| 2007/0091373 | A1 | * | 4/2007  | Sato et al. | ..................... 358/1.18 |
| 2007/0293215 | A1 | * | 12/2007 | Dawson | ........................ 455/433 |

FOREIGN PATENT DOCUMENTS

| JP | 2001-142665   |   | 5/2001  |
| JP | 2002-351274 A |   | 12/2002 |
| JP | 2004-021642   |   | 1/2004  |
| JP | 2004-326580   |   | 11/2004 |
| JP | 2005056035 A  | * | 3/2005  |
| JP | 2005-243041   |   | 9/2005  |
| JP | 2005-284947   |   | 10/2005 |
| JP | 2006-053614   |   | 2/2006  |
| JP | 2006-099420   |   | 4/2006  |
| JP | 2007-156786   |   | 6/2007  |

* cited by examiner

*Primary Examiner* — Benny Q Tieu
*Assistant Examiner* — Juan Guillermety
(74) *Attorney, Agent, or Firm* — Edwards Wildman Palmer LLP; David G. Conlin; David A. Tucker

(57) ABSTRACT

An image processing apparatus 30 is used with an IC card 32 capable of outputting first location information specifying a location where a user belongs to, and includes a card reader 50 obtaining the first location information from the IC card 32, a GPS 54 obtaining second location information related to a location where the image processing apparatus 30 is installed, and location information comparing modules 52 and 56 connected to the first and second location information obtaining apparatuses and permitting or restricting use of the image processing apparatus 30 depending on whether the region specified by the first location information overlaps with the location indicated by the second location information.

9 Claims, 13 Drawing Sheets

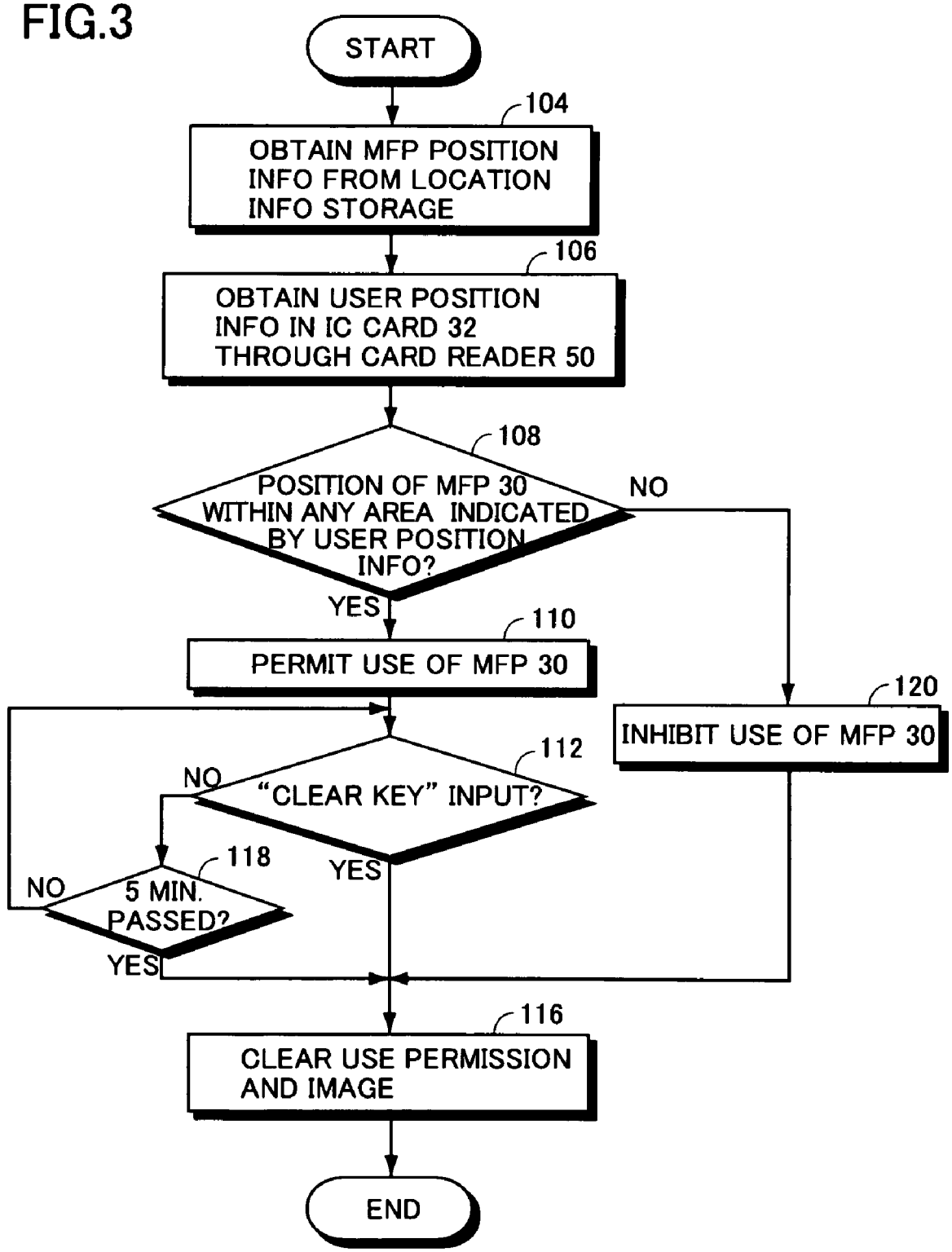

AUTHENTICATION TECHNIQUE THAT CAN SIMPLIFY WORKS NECESSARY WHEN THE PRINTER POSITION IS CHANGED, PERSONNEL ALLOCATION IS CHANGED, OR A NEW PRINTER IS INSTALLED

CROSS-REFERENCE TO RELATED APPLICATION

This nonprovisional application claims priority under 35 U.S.C §119(a) on Patent Application No. 2007-218958 filed in Japan on Aug. 24, 2007, the entire contents of which are hereby incorporated by reference.

BACKGROUND OF THE INVENTION

1. Field of the Invention

The present invention relates to a user authentication technique for a printer and, more specifically, to an authentication technique that can simplify works necessary when the printer position is changed, personnel allocation is changed, or a new printer is installed.

2. Description of the Background Art

Conventionally used copy machines come to be increasingly replaced with multifunctional printers (hereinafter referred to as "MFP") having, thanks to recent technical developments, a scanner function, a facsimile function and the like in addition to the printing function.

Particularly, in an organization such as a company or school, an MFP is shared by users. Often the users permitted to use the MFP are limited on a department-by-department basis. Without such restriction, departmental expense control would be meaningless. User restriction, however, must be done efficiently.

An MFP system as a solution to this problem is disclosed in Japanese Patent Laying-Open No. 2007-156786 (hereinafter referred to as "'786 application"). In the MFP system, user authentication is done by using a so-called IC (Integrated Circuit) card and a password. According to this technique, an IC (Integrated Circuit) card that stores a key number is given to each person who uses the MFP. Each MFP in the system has the key number and associated information of each person who uses the MFP registered therein. When a user holds the IC card over a card reader of the MFP, MFP asks a password. When the user inputs the password in response to the request, authentication takes place. The user is permitted to use the MFP only when the information (key number and password) input by the user matches the information in the MFP system.

If the user restriction of the printer is realized on a department-by-department basis by the system disclosed in '786 application, departmental expense control can reliably be effected.

The system, however, has the following problem. An MFP or the entire system may be moved to a different department, or a new MFP may be installed. In the system disclosed in '786 application, it is necessary in such a situation to newly register the key number and password information of each and every user permitted to use the MFP. If a new user is added, the same piece of information must be added to all MFPs. Such registration requires time and labor.

Without such registration, a person who should naturally be permitted to use the MFP cannot use the MFP. This may greatly influences business progress.

Such a problem commonly arises not only in the multifunctional printer described above but in general image processing apparatuses.

SUMMARY OF THE INVENTION

Therefore, an object of the present invention is to provide an image processing apparatus that can simplify works necessary for designating a user permitted to use the image processing apparatus.

Another object of the present invention is to provide an image processing apparatus that can simplify works necessary for designating a user permitted to use the image processing apparatus, by performing user authentication based on information related to position or location of the apparatus.

A further object of the present invention is to provide an image processing apparatus that can simplify works necessary for designating a user permitted to use the image processing apparatus, by performing user authentication based on information related to position or location of the apparatus and on information obtained from an authentication device held by the user.

According to a first aspect of the present invention, an image processing apparatus, used with an external device capable of outputting first location information specifying a certain region, includes: a first location information obtaining device obtaining the first location information from the external device; a second location information obtaining device obtaining second location information related to a location where the image processing apparatus is installed; and an authentication device connected to the first and second location information obtaining devices and permitting use of the image processing apparatus if a predetermined criterion for determining that the region specified by the first location information overlaps with the location indicated by the second location information is satisfied, and restricting use of the image processing apparatus if not.

The first location information obtaining apparatus obtains the first location information from the external device. The second location information obtaining apparatus obtains the second location information related to the location where the image processing apparatus is installed. The authentication apparatus permits or restricts use of the image processing apparatus depending on whether the region specified by the first location information overlaps with the location indicated by the second location information. As a result, a user having the external device outputting the location information satisfying such a criterion is permitted to use the image processing apparatus, while use is restricted to other users. It is unnecessary to store in the image processing apparatus the information representing permission or restriction of use for each user. As a result, it becomes possible to provide an image processing apparatus that can simplify works necessary for designating a user permitted to use the image processing apparatus.

Preferably, the second location information obtaining device includes a GPS (Global Positioning System) module.

By using the latitude and longitude information from the GPS module, authentication of the image processing apparatus can be utilized at any place where GPS is available.

In another preferred embodiment, each of the first location information and the second location information includes an IP address; and the authentication device includes a comparator connected to the first and second location information obtaining devices, for comparing network mask portions of first and second IP addresses included in the first location information and the second location information, and a control device coupled to receive an output of the comparator, for permitting or restricting use of the image processing apparatus depending on whether the network mask portions of the first and second IP addresses match or not.

That the network mask portions of two IP addresses match means that the two belong to the same segment on the network. Therefore, the user having the external device belonging to the same segment as the image processing apparatus is permitted to use the image processing apparatus, and use is restricted to other users. It is unnecessary to store in the image processing apparatus the information related to authority of each user. Thus, it becomes possible to provide an image processing apparatus that can simplify works necessary for designating a user permitted to use the image processing apparatus, by performing user authentication based on information related to position or location of the apparatus and on information obtained from an authentication device held by the user.

The first location information may include latitude and longitude information indicating a region to which the external device belongs and a prescribed area code. The second location information obtaining device may include a GPS module, and a wireless receiving device obtaining an area code from outside by wireless communication. The authentication device includes a first comparator coupled to receive outputs of the first location information obtaining device and the GPS module, for comparing the region specified by the latitude and longitude information included in the first location information with latitude and longitude obtained by the GPS module, and outputting a first determination signal, a second comparator coupled to receive outputs of the first location information obtaining device and the wireless receiving device, for determining matching of the prescribed area code included in the first location information and the area code received by the wireless receiving device, and outputting a second determination signal, and a control device coupled to receive the first and second determination signals and permitting or restricting use of the image processing apparatus in accordance with combination of values of the first and second determination signals.

The latitude and longitude information obtained by the GPS module and the latitude and longitude information obtained from the external device are compared, and whether the area code received by the radio receiver matches the area code obtained from the external device or not is determined. In accordance with the combination of these determination results, use of the image processing apparatus is permitted or restricted. It is unnecessary to store in the image processing apparatus the information related to authority of each user. Thus, it becomes possible to provide an image processing apparatus that can simplify works necessary for designating a user permitted to use the image processing apparatus with high reliability, by performing user authentication based on information related to position or location of the apparatus and on information obtained from an authentication device held by the user.

More preferably, the first location information includes a region name representing a region to which a holder of the external device belongs; the second location information obtaining device includes a GPS module, a region name database storing latitude and longitude and corresponding region name, and a search device coupled to receive an output of the GPS module, for retrieving a region name stored in the region name database in correspondence with the output of the GPS module; and the authentication device includes a comparator coupled to the first location information obtaining device and the search device, for comparing the region name included in the first location information with the region name retrieved by the search device, and outputting a comparison signal, and a control device coupled to receive the comparison signal, and permitting or restricting use of the image processing apparatus depending on a value of the comparison signal.

From the relation between the latitude and longitude information obtained from the GPS module and the region name data base, the region name allocated to the position where the image processing apparatus is placed is found. The region name and the region name obtained from the external device are compared, and in accordance with the result of comparison, whether the use of image processing apparatus by the user is permitted or not is determined. It is unnecessary to store in the image processing apparatus the information related to authority of each user. Further, region names prepared by the organization can be used and, therefore, authentication related to the use of image processing apparatus can be effected flexibly with high reliability.

The first location information obtaining device may be a card reader capable of contactless communication with an external IC card, or a USB memory interface.

According to a second aspect of the present invention, a method of authentication for an image processing apparatus used with an external device capable of outputting first location information specifying a certain region, includes: the steps of: obtaining the first location information from the external device; obtaining second location information related to a location where the image processing apparatus is installed; and authentication step of receiving the first location information obtained at the step of obtaining first location information and the second location information obtained at the step of obtaining second location information, permitting use of the image processing apparatus if a predetermined criterion for determining that the region specified by the first location information overlaps with the location indicated by the second location information, and restricting use of the image processing apparatus if not.

According to a third aspect of the present invention, a computer program, when executed by a computer, causes the computer to execute a method of authentication for an image processing apparatus used with an external device capable of outputting first location information specifying a certain region, the method including the steps of: obtaining the first location information from the external device; obtaining second location information related to a location where the image processing apparatus is installed; and authentication step of receiving the first location information obtained at the step of obtaining first location information and the second location information obtained at the step of obtaining second location information, permitting use of the image processing apparatus if a predetermined criterion for determining that the region specified by the first location information overlaps with the location indicated by the second location information is satisfied, and restricting use of the image processing apparatus if not.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart representing a control structure of an authentication program for realizing MFP 30 shown in FIG. 1.

DESCRIPTION OF THE PREFERRED EMBODIMENTS

Figure 1:
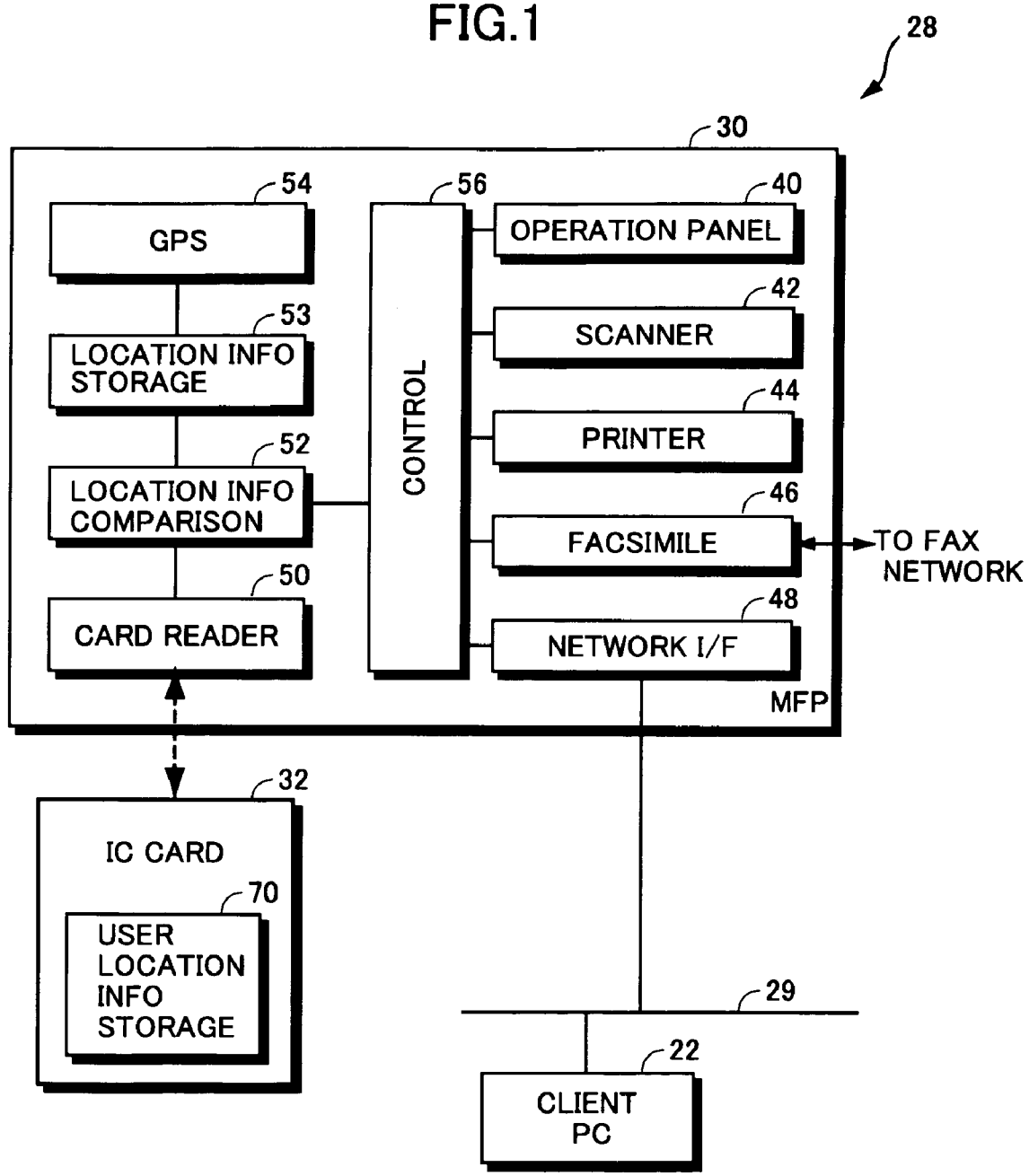
FIG. 1 is a schematic block diagram of MFP 30 in accordance with a first embodiment of the present invention.

In the following description and in the drawings, the same components are denoted by the same reference characters. Their names and functions are also the same. Therefore, detailed description thereof will not be repeated.

The image processing apparatus in accordance with the present embodiments is an MFP, and it holds geographical information related to the location where it is positioned. A device (such as an IC card) storing geographical information related to the location where the user belongs, is given to the user. When the geographical information obtained from the user's device matches the information held in the MFP (for example, geographical matching), the MFP permits the user to use the MFP and if not, use of the MFP by the user is restricted. In the following description, such geographical information will be referred to as the "location information."

In the embodiments described in the following, when user authentication succeeds, use of the MFP by the user is permitted, and if authentication fails, use of the MFP by the user is inhibited. The present invention, however, is not limited to such an embodiment, and it may be possible to permit use of only a part of the functions by the user if the authentication fails. Further, functions permitted to the user may be restricted stepwise in accordance with the level of authentication.

First Embodiment

The first embodiment utilizes latitude and longitude of the position where the multifunctional printer is installed, as the location information. In the following, the information such as the latitude and longitude, for specifying a geographical point or a prescribed region will be referred to as the "position information."

—Structure—

FIG. 1 shows, in a block diagram, overall structure of an MFP authentication system 28 in accordance with an embodiment of the present invention.

Referring to FIG. 1, MFP authentication system 28 includes a TCP/IP (Transfer Control Protocol/Internet Protocol) network 29, a client PC (Personal Computer) 22 connected to network 29, and an MFP 30 connected to network 29 and having scanner, printer and facsimile (FAX) functions. A user holds a contactless type IC card 32 that stores position information of the user.

Though not specifically shown in FIG. 1, MFP authentication system 28 may include a plurality of MFPs similar to MFP 30. The number of IC cards 32 is not specifically limited, either.

MFP 30 includes: an operation panel 40 including of a touch panel; a scanner 42; a printer 44; a facsimile 46 connected to an external FAX line not shown; a network I/F 48 connected to network 29; and a card reader 50 for obtaining, in a contactless manner, the user position information stored in IC card 32 by wireless communication to/from IC card 32. As will be described later, a clear key (not shown) is provided for clearing settings, after the user ends use of MFP 30.

MFP 30 further includes: a GPS module 54 for obtaining position information of MFP 30 by receiving radio signal from a GPS satellites when MFP 30 is powered on; a location information storage unit 53 for storing position information of MFP 30 obtained by GPS module 54; a location information comparing module 52 connected to location information storage unit 53 and card reader 50 for comparing the position information of MFP 30 stored in location information storage unit 53 and the user position information obtained by card reader 50; and a control unit 56, which is substantially a computer, connected to operation panel 40, scanner 42, printer 44, FAX 46, network I/F 48 and location information comparing module 52, respectively, and controlling these components in accordance with a prescribed program, for permitting use of MFP 30 by a user having the location information satisfying prescribed conditions (here, position information) and restricting use of MFP 30 to other users, depending on the result of comparison by location information comparing unit 52.

IC card 32 includes a user location information storage unit 70 for storing position information of the user. Before delivering IC card 32 to the user, an administrator of MFP authentication system 28 stores the information in user location information storage unit 70.

Figure 2A:
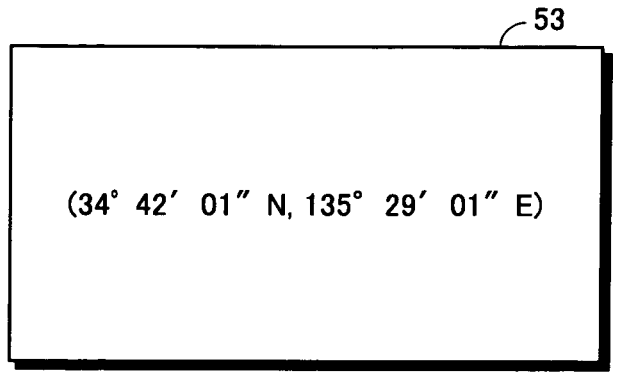
FIGS. 2A, 2B and 2C are schematic illustrations showing location information stored in a location information storage unit 53 and the like and the method of comparison executed by a location information comparing module 52.

FIG. 2A shows exemplary position information of MFP 30 stored in location information storage unit 53 of MFP 30. In this example, position information of MFP 30 is latitude/longitude information obtained by the GPS, which indicates that MFP 30 is positioned at latitude 34°42'01" north and longitude 135°29'01" east.

Figure 2B:
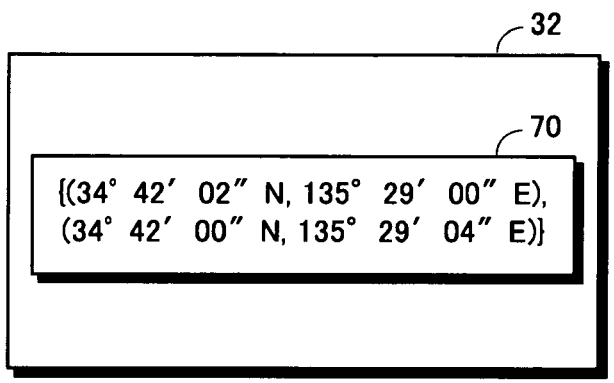

FIG. 2B shows exemplary position information of the user stored in user location information storage unit 70. In the present embodiment, user location information storage unit 70 stores position information of a set of two spots. In the example shown in FIG. 2B, the user position information includes the first position (latitude 34°42'02" north and longitude 135°29'00" east) and the second position (latitude 34°42'00" north and longitude 135°29'04" east). Though only one set of position information is stored in this example, two or more sets may be stored, as will be described later.

Figure 2C:
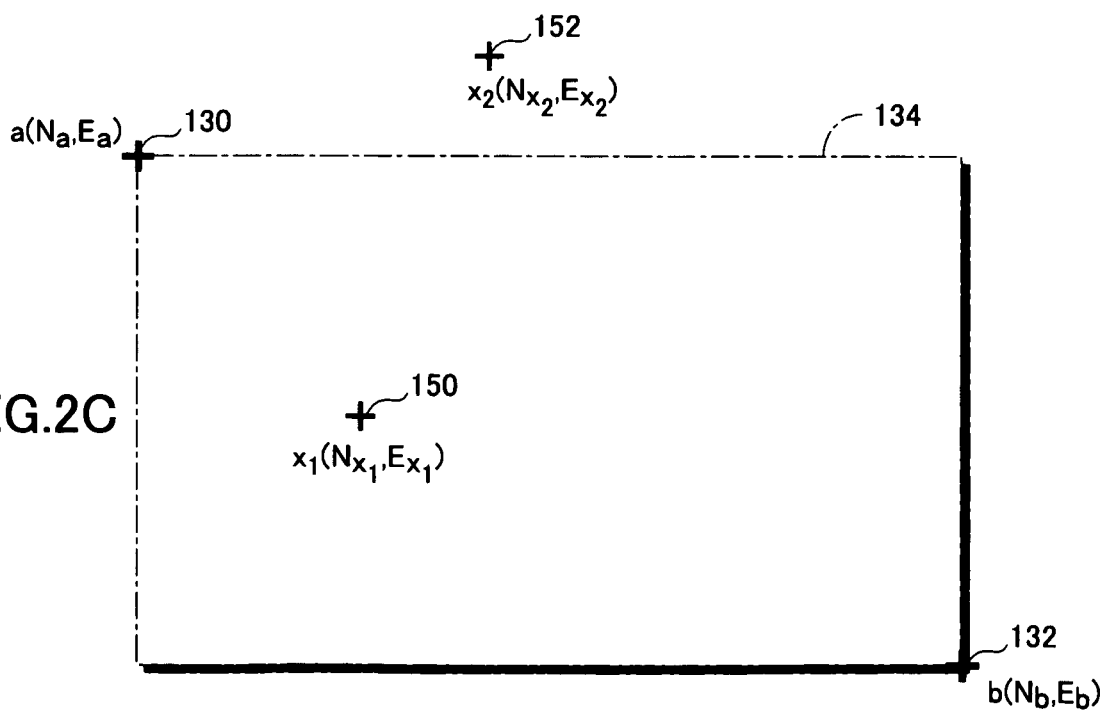

FIG. 2C shows an area represented by the position information of the user. Spot a (Na, Ea) 130 and spot b (Nb, Eb) 132 represent two spots (first and second positions) defined by the set of position information of the user, stored in user location information storage unit 70. The position information set represents a rectangular area 134 of which diagonal extends between spot a 130 and spot b 132. The user position information represents that the user belongs to the location in this area 134. The shape of area 134 is selected such that each side of the rectangle is parallel to the latitude or longitude.

Control unit 56 and location information comparing module 52 are substantially implemented by a computer including a CPU (Central Processing Unit), not shown, and attain the above-described functions by executing a prescribed authentication program. FIG. 3 is a flowchart representing the control structure of the authentication program executed by the computer that implements control unit 56 and location information comparing module 52. As described above, the position information of MFP 30 is obtained when MFP 30 is powered on, and stored in location information storage unit 53. When the user moves his/her IC card 32 to the range of card reader 50 and card reader 50 detects it, execution of the program starts.

Referring to FIG. 3, the program includes a step 104 of obtaining position information of MFP 30 stored in location information storage unit 53, a step 106, following step 104, of obtaining user position information from IC card 32 through card reader 50, and a step 108, following step 106, of determining whether the location identified by the position information of MFP 30 is within the area indicated by the user position information, and branching the control flow depending on the result of determination.

Specifically, at step S108, the following determination is made.

Referring to FIG. 2C, location information comparing module 52 determines whether the spot x indicated by the position information of MFP 30 falls within the rectangular area 134 of which diagonal extends between spot a 130 and spot b 132. By way of example, a spot x1 (Nx1, Ex1) 150 shown in FIG. 2C is within the area 134, because $Nb \leq Nx1 \leq Na$ and $Ea \leq Ex1 \leq Eb$. On the other hand, a spot x2 (Nx2, Ex2) 152 is determined to be outside the area 134, because the condition $Nb \leq Nx2 \leq Na$ is not satisfied.

Again referring to FIG. 3, the program further includes a step 110 of permitting use of MFP 30 by the user, in response to the determination of YES at step S108, a step 112, following step 110, of determining whether there is an input of "clear key" or not, and branching the control flow depending on the result of determination, a step 116 of clearing the user permission of MFP 30 and setting inhibited state in response to the determination that there has been a "clear key" input at step 112 and further clearing image display on operation panel 40 to end the process, and a step 118 of determining whether five minutes have passed without any input in response to a determination of NO at step 112, and branching the control flow depending on the result of determination. If it is determined at step 118 that five minutes have passed, the process proceeds to step 116 and if not, the process returns to step 112. The program further includes a step 120 of inhibiting use of MFP 30 by the user, in response to a determination of NO at step S108.

—Operation—

Referring to FIG. 1, MFP authentication system 28 operates in the following manner. When MFP 30 is powered on, GPS module 54 receives a radio signal from the GPS satellites, and obtains position information of MFP 30. The obtained information is stored in location information storage unit 53.

Assume that the user moves IC card 32 to a range of card reader 50 of MFP 30, to use MFP 30. The radio wave from card reader 50 includes a small electric power in a circuit within IC card 32. IC card 32 processes information using the electric power, and transmits the information stored in IC card 32 to card reader 50. In response to reception of the information by card reader 50, the program, of which control structure is shown in FIG. 3, is activated in MFP authentication system 28.

Referring to FIG. 3, at steps 104 and 106, location information comparing module 52 reads pieces of position information of MFP 30 and of the user, from location information storage unit 53 and user location information storage unit 70 in IC card 32, respectively.

The obtained location information is compared as shown in FIG. 2C. At step 108, location information comparing module 52 determines whether or not the position information of MFP 30 indicates any position in the area indicated by the user position information. If the determination is YES, the user is permitted to use MFP 30 at step 110. If the determination is NO, use of MFP 30 by the user is inhibited at step 120.

When use of MFP 30 by the user is permitted, in accordance with a user input through operation panel 40, control unit 56 sends instructions to scanner 42, printer 44 and FAX 46, to cause an operation in accordance with the user input.

After the start of use by the user, when the user inputs "clear key" on operation panel 40 (YES at step 112), control unit 56 clears the permission of use at step 116 (sets MFP 30 to a state where MFP 30 is not permitted to use), clears the image on operation panel 40, and terminates the process. Even if the user forgets to press the clear key, control unit 56 clears the permission of use and the image in the similar manner if five minutes passes without any operation (YES at 118), and terminates the process. Therefore, even if the user forgets to press the clear key, it is possible to prevent use of MFP 30 by an unauthenticated user.

Figure 4:
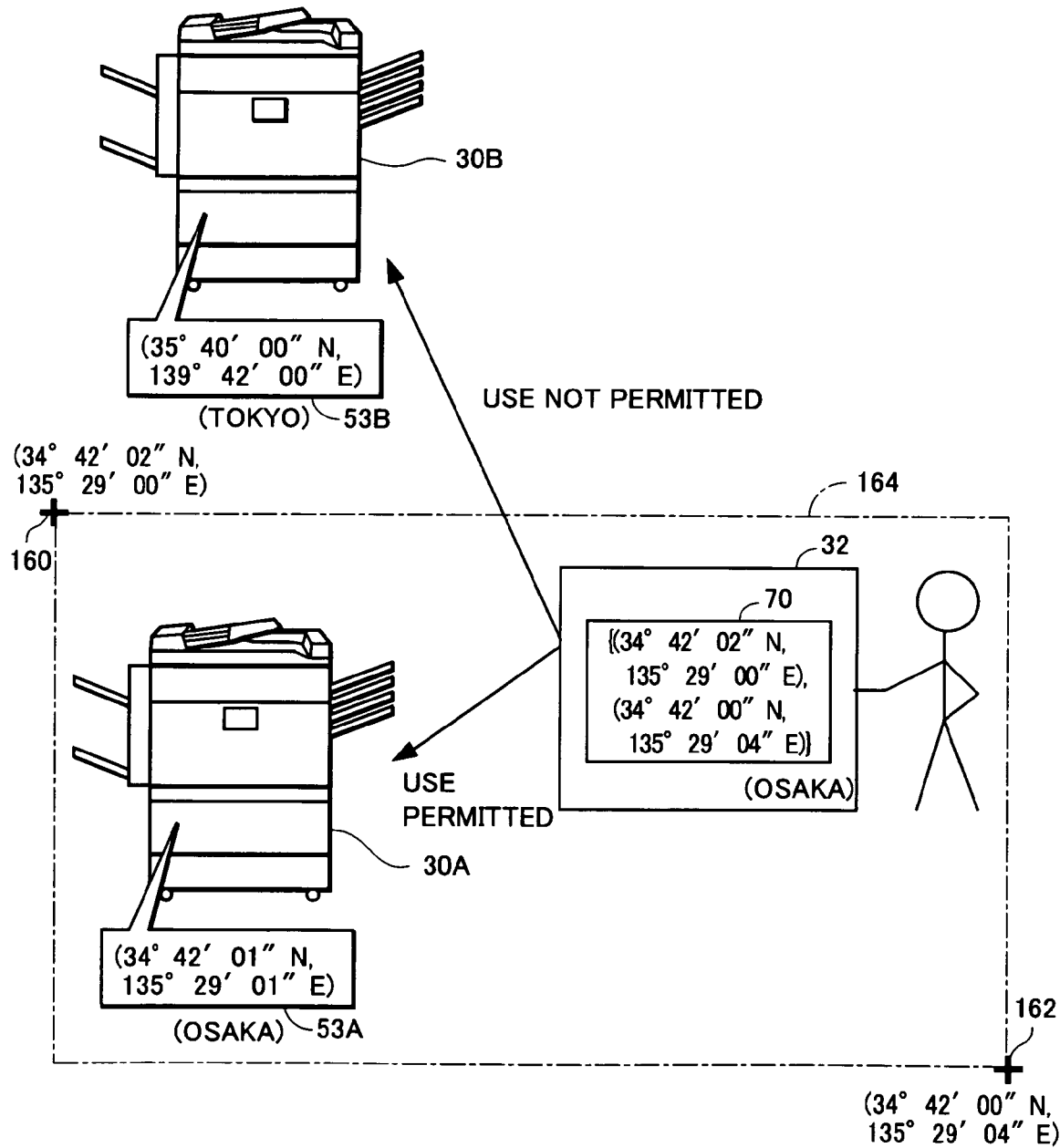
FIG. 4 shows a specific example of use of MFP authentication system 28 shown in FIG. 1.

Referring to FIG. 4, the authentication function attained by MFP authentication system 28 in accordance with the present embodiment will be described. The system shown in FIG. 4 includes MFPs 30A and 30B having the same structure as MFP 30 shown in FIG. 1, and an IC card 32 of the user. It is assumed that MFP 30A is installed around Osaka, of which position information is (latitude 34°42'01" north, longitude 135°29'01" east). It is assumed that MFP 30B is installed around Tokyo, of which position information is (latitude 35°40'00" north, longitude 139°42'00" east).

Referring to FIG. 4, assume that a user belongs to an area 164 defined by a first spot 160 (latitude 34°42'02" north, longitude 135°29'00" east) and a second spot 162 (latitude 34°42'00" north, longitude 135°29'04" east). Namely, in user location information storage unit 70 in IC card 32 delivered to the user, the latitude and longitude information of the first spot 160 and the latitude and longitude information of the second spot 162 are stored as a set of position information.

Assume that the user moves IC card 32 to the range of card reader of MFP 30A, to use MFP 30A positioned in area 164. In MFP 30A, the position information of MFP 30A stored in location information storage unit 53A is compared with the user position information indicating area 164 obtained from IC card 32. Here, the spot represented by the position information of MFP 30A is within the area 164. Therefore, the user is permitted to use MFP 30.

Now, assume that the user goes to Tokyo on business, and tries to use MFP 30B. When IC card 32 enters the range of card reader of MFP 30B, MFP 30B compares the position information of MFP 30B stored in location information storage unit 53B with the user position information read from IC card 32. Here, the spot represented by the position information of MFP 30B is out of the area 164. Therefore, the user is not permitted to use MFP 30B.

As described above, by the MFP authentication system in accordance with the present embodiment, when the MFP is updated to a new one, or the MFP is moved to a different spot, the position information of the MFP is automatically updated corresponding to the spot. A user who belongs to the regional area can immediately use the MFP. Even a user who is newly assigned to the regional area can use the MFP installed in the regional area, if the position information representing the regional area is stored in the IC card of the user. It is unnecessary to register the key number of each user, while restriction of use of the MFP can appropriately be ensured.

Second Embodiment

Figure 5:
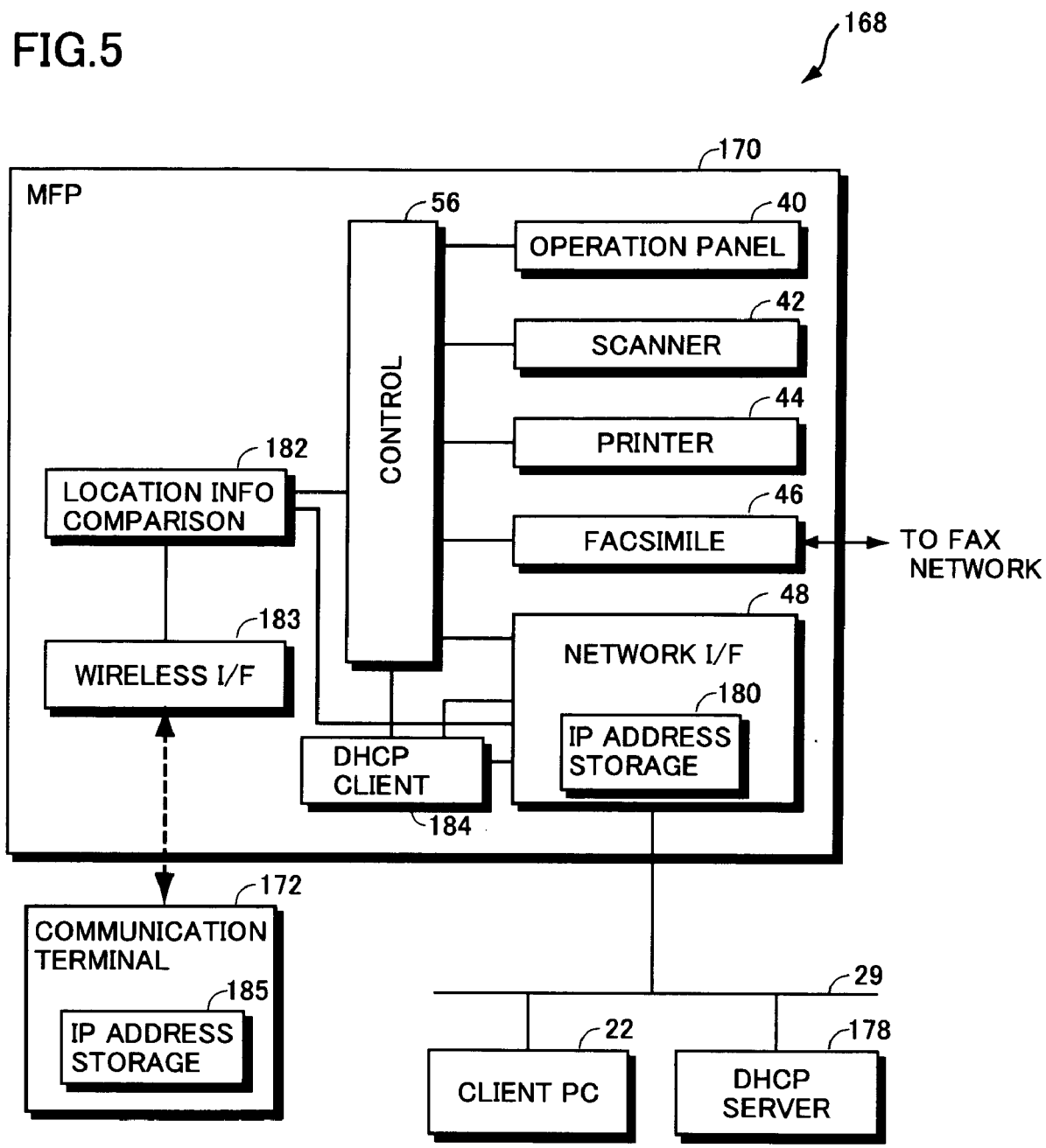
FIG. 5 is a schematic block diagram of MFP 170 in accordance with a second embodiment of the present invention.

In the second embodiment, IP (Internet Protocol) address is utilized as the location information.
—Structure—
FIG. 5 shows, in a block diagram, an outline of MFP authentication system 168 in accordance with the second embodiment.

Referring to FIG. 5, MFP authentication system 168 includes a network 29, and an MFP 170, a client PC 22 and a DHCP (Dynamic Host Configuration Protocol) server 178, all connected to network 29, and a communication terminal 172 capable of wireless communication with MFP 170 and having an IP address of network 29 allocated thereto.

MFP 170 has a structure similar to that of MFP 30 shown in FIG. 1 and, in place of location information storage unit 53, GPS module 54, card reader 50 and location information comparing module 52, it includes a wireless I/F 183 for wireless communication with communication terminal 172, and a location information comparing module 182 for determining whether or not the IP address of an external device and the IP address of MFP 170 belong to the same network segment. MFP 170 further includes a DHCP client 184 connected to control unit 56 and network I/F 48 for dynamically receiving IP address allocation of MFP 170 from DHCP server 178. For TCP/IP communication, network I/F 48 includes, as shown in FIG. 5, an IP address storage unit 180 connected to location information comparing module 182 and DHCP client 184. DHCP client 184 has a function of dynamically receiving IP address allocation from DHCP server 178, when a valid IP address is not stored in IP address storage unit 180, a lease period of IP address is terminated or IP address update is explicitly designated by the user, and storing the allocated IP address in IP address storage unit 180. Network I/F 48 is capable of communicating with client 22 or the like, using the IP address.

As in the first embodiment, wireless I/F 183 has a function of a card reader that can receive information from the IC card and, different from card reader 50 of the first embodiment, it is capable of communication with communication terminal 172 or the like by short distance wireless communication. In the present embodiment, wireless I/F 183 has a function of obtaining the IP address of communication terminal 172 from communication terminal 172, using the wireless communication. Here, among the functions of wireless I/F 183, the card reader function is the same as that of the first embodiment and, therefore, description thereof will not be repeated here.

Location information comparing module 182 in accordance with the present embodiment is different from the location information comparing module 52 of the first embodiment in that module 182 handles IP addresses as location information and determines whether the IP address of communication terminal 172 and the IP address of MFP 170 belong to the same segment or not.

Control unit 56 determines whether use of MFP 170 by the user of communication terminal 172 should be permitted or not, depending on the result of comparison by location information comparing module 182, and controls various components of MFP 170 in accordance with the result of determination.

Communication terminal 172 includes an IP address storage unit 185 for storing the IP address as the user location information. Here, it is assumed that the IP address of communication terminal 172 is fixedly allocated beforehand to communication terminal 172 and stored in IP address storage unit 185.

As is well known, an IP address is 32-bit information representing a logical address on the network. Typically, the IP address is divided into 8-bit octets and includes combination of four numbers from 0 to 255 in decimal notation, each separated by a decimal dot ".", for easier understanding by a person. The network segment represents a concept for determining whether the IP addresses belong to the same network or not. Generally, when a few upper bits among 32 bits are common, the IP addresses are determined to be addresses belonging to the same segment. The number of bits used here differs network by network, and represented by a so-called network mask. In short, if two IP addresses have the same network mask portions, the two addresses belong to the same segment and if not, these belong to different segments.

Figure 6:
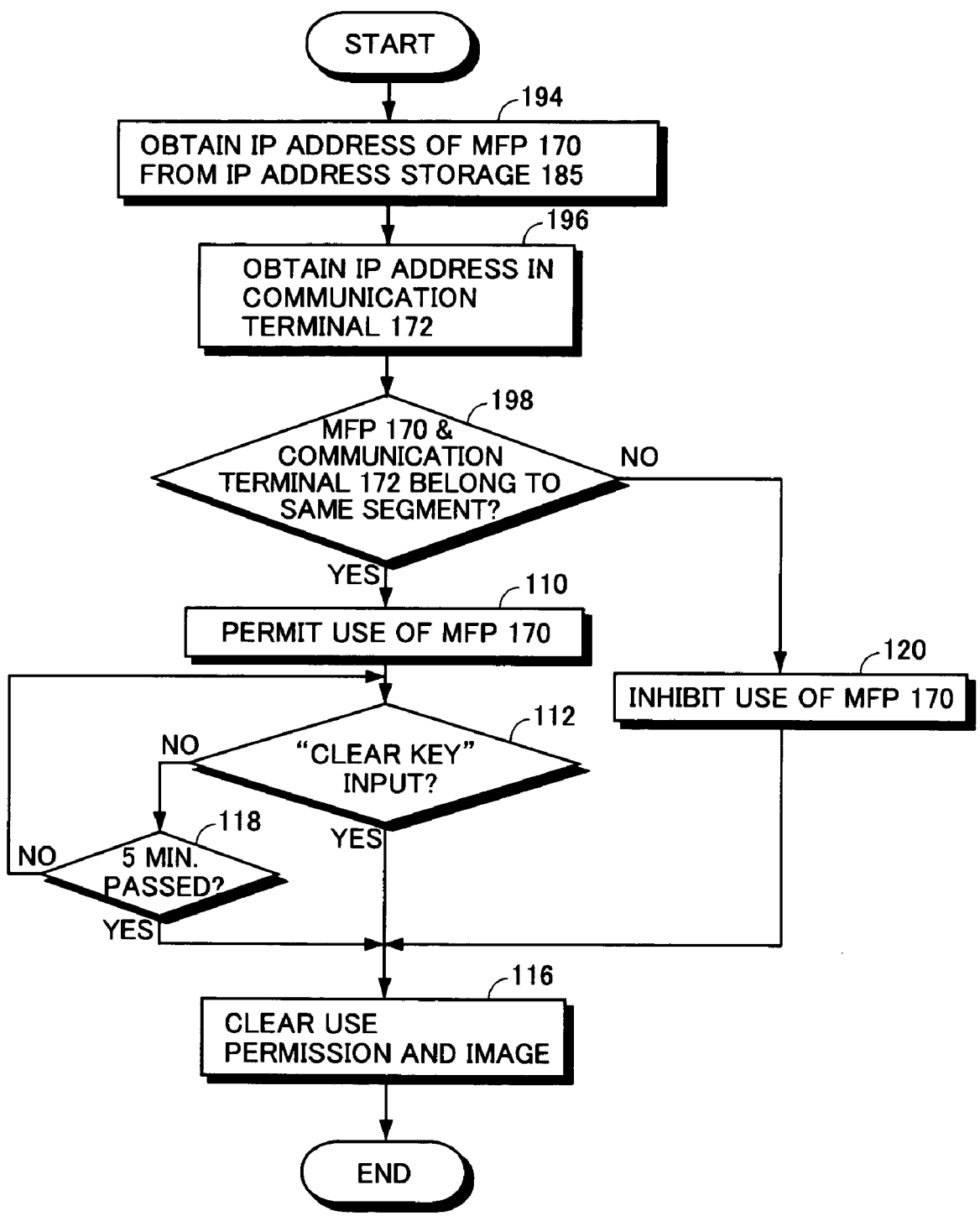
FIG. 6 is a flowchart representing a control structure of an authentication program for realizing MFP 170 shown in FIG. 5.

Functions of control unit 56 and location information comparing module 182 for performing authentication using IP addresses are substantially realized by a computer and a prescribed authentication program executed by the computer. FIG. 6 is a flowchart representing the control structure of the prescribed authentication program.

Referring to FIG. 6, the program includes a step 194 of obtaining an IP address of MFP 170 stored in IP address storage unit 180, a step 196, following step 194, of obtaining an IP address of communication terminal 172 through wireless I/F 183, and a step 198, following step 196, of comparing the IP address of MFP 170 with the IP address of communication terminal 172 by location information comparing module 182, determining whether these addresses belong to the same segment, and branching the control flow depending on the result of determination. If the determination at step 198 is YES, the process proceeds to step 110 and the following, which are similar to the first embodiment. If the result of determination is NO, the process proceeds to step 120 and the following of the first embodiment. Control structures after step 110 and step 120 are the same as those of steps 110 and 120 of the first embodiment shown in FIG. 3.

—Operation—
Referring to FIG. 5, MFP authentication system 168 operates as follows.

DHCP client 184 automatically obtains the IP address from DHCP server 178, when MFP 170 is newly connected to network 29. The obtained IP address is stored in IP address storage unit 180.

Assume that the user moves communication terminal 172 to a range of wireless I/F 183 in MFP 170 to use MFP 170. Then, wireless I/F 183 and communication terminal 172 automatically start communication and, in response, the program, of which control structure is shown in FIG. 6, is activated.

Referring to FIG. 6, at steps 194 and 196, control unit 56 obtains IP addresses of MFP 170 and communication terminal 172 from IP address storage units 180 and 185, respectively.

The obtained IP addresses are compared at step 198. Location information comparing module 182 determines whether or not the two IP addresses belong to the same segment. If it is determined that the two belong to the same segment (YES at step 198), control unit 56 permits the user to use MFP 170 at step 110. If the IP addresses of the two do not belong to the same segment (NO at step 198), control unit 56 inhibits use of MFP 170 by the user, at step 120. Subsequent processes are the same as those of the first embodiment.

In the present embodiment, in the network where the IP address of the MFP is dynamically set by the DHCP server, the IP address as the location information is automatically set to the MFP. If a communication terminal belonging to the same segment is capable of communicating with the MFP, use of MFP by the user of the communication terminal is permitted, and use of MFP by other users is restricted. Therefore, when a new MFP is introduced, manual labor for setting the MFP to restrict the use of MFP to only the users on the network segment is not at all required. Use of the MFP is permitted only to the user having a communication terminal of which allocated IP address belongs to the same segment. Therefore, use of MFP can be restricted by a geographical factor of the same segment. Therefore, resetting of each communication terminal is unnecessary.

Third Embodiment

In the first embodiment, the position information obtained by GPS is used as the location information. Though GPS accuracy has been improved, it is impossible, for example, to distinguish a second floor of a building from a third floor. If departments differ floor by floor, it is necessary to control use of MFPs while distinguishing one floor from another in the building. Such a detailed management is impossible if GPS only is used. Therefore, in the present embodiment, position information from the GPS and the IP address are both used as the location information.

—Structure—

Figure 7:
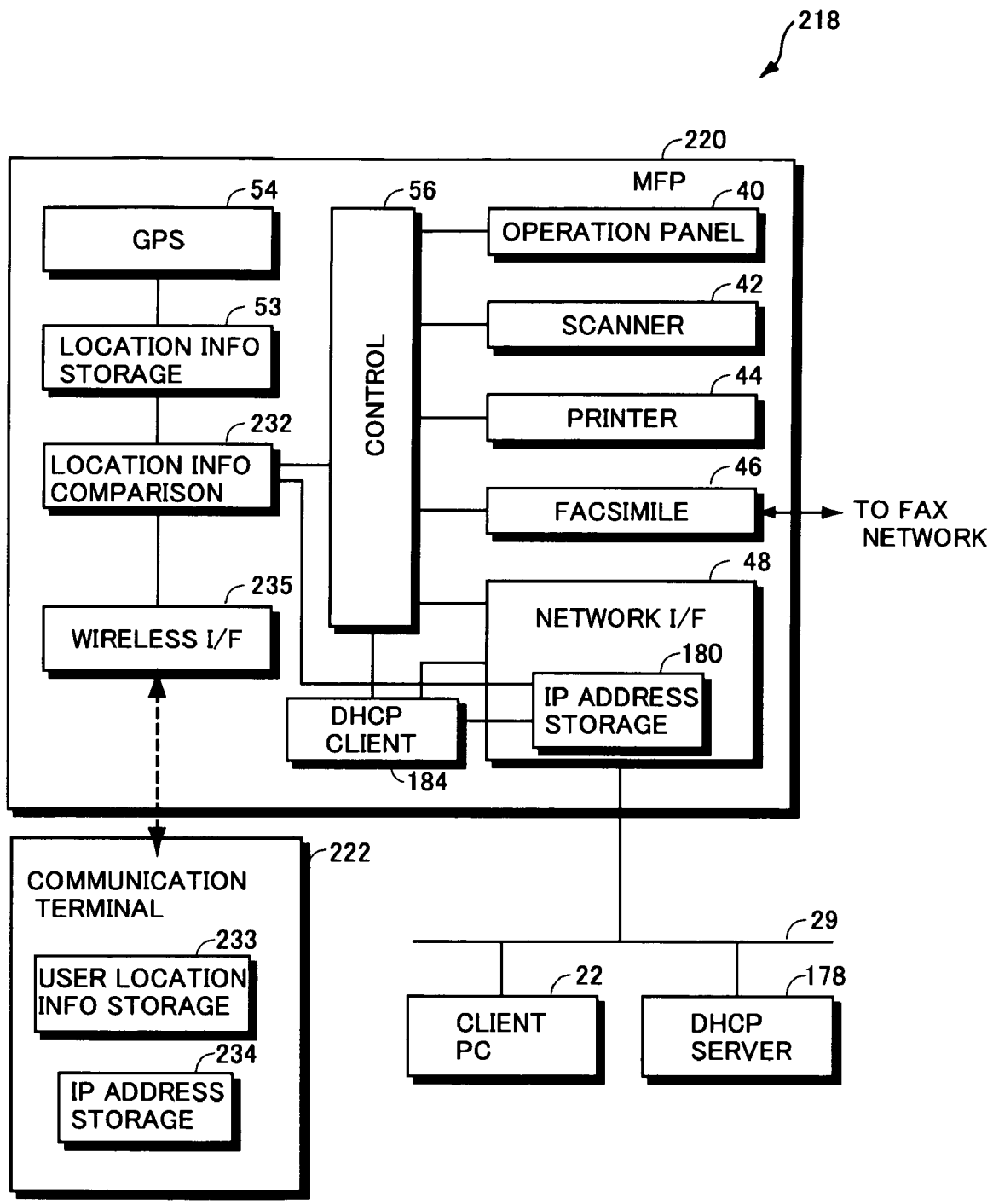
FIG. 7 is a schematic block diagram of MFP 220 in accordance with a third embodiment of the present invention.

FIG. 7 is a block diagram showing MFP 220 in accordance with the third embodiment and surrounding environment.

Referring to FIG. 7, MFP 220 constitutes a part of MFP authentication system 218. MFP authentication system 218 includes, in addition to MFP 220, network 29, client 22, DHCP server 178, and a communication terminal capable of communication with MFP 220.

Communication terminal 222 includes an IP address storage unit 234 for storing an IP address of communication terminal 222, and a user location information storage unit 233 for storing position information indicating the location where the user of communication terminal 222 belongs. The position information stored in user location information storage unit 233 is similar to the position information of the first embodiment. IP address storage unit 234 and user location information storage unit 233 may be provided in a common non-volatile memory, such as a flash ROM.

MFP 220 has a structure similar to that of MFP 170 shown in FIG. 5. It is noted, however, that MFP 220 includes, in place of location information comparing module 182 and wireless I/F 183, a GPS module 54 and location information storage unit 53 similar to those shown in FIG. 1, a wireless I/F 235 for obtaining user position information from communication terminal 222 and IP address of communication terminal 222 through wireless communication with communication terminal 222, and a location information comparing module 232 for comparing the position information read from location information storage unit 53 and IP address read from IP address storage unit 180 with the position information and the IP address received by wireless I/F 235 from communication terminal 222 to determine whether the same condition as in the first embodiment is satisfied between the two pieces of position information and whether the same condition as in the second embodiment is satisfied between the two IP addresses.

In accordance with the result of comparison by location information comparing module 232, control unit 56 determines whether the use of MFP 220 by the user of communication terminal 222 is to be permitted or not, and controls various components of MFP 220 in accordance with the result of determination.

Figure 8:
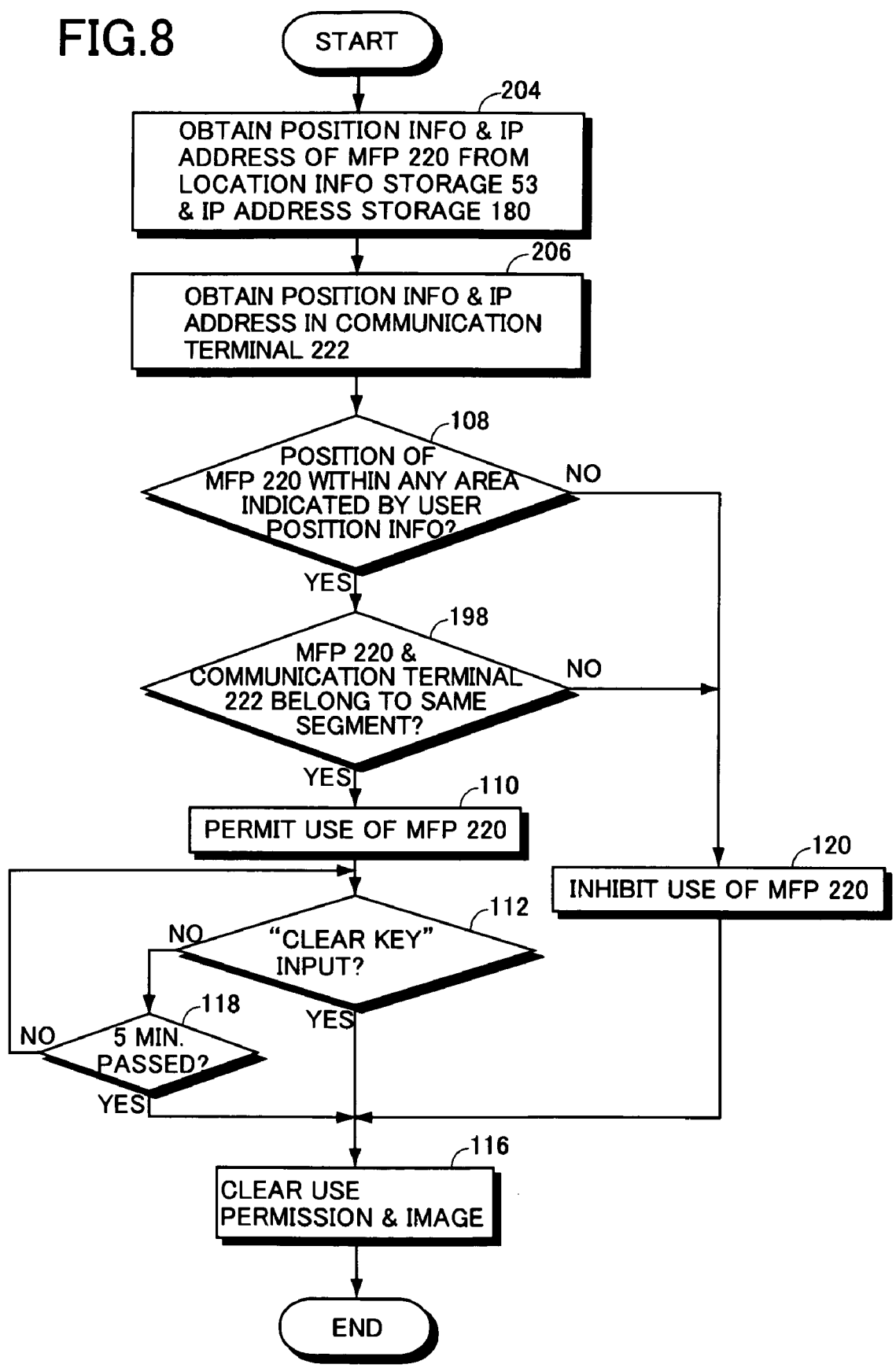
FIG. 8 is a flowchart representing a control structure of an authentication program for realizing MFP 220 shown in FIG. 7.

The functions of control unit 56 and location information comparing module 232 are substantially realized by a computer and an authentication program executed by the computer. FIG. 8 is a flowchart representing the control structure of the authentication program.

Referring to FIG. 8, the control structure of the present program is similar to the control structure of the program shown in FIG. 3. The program, however, differs from that of FIG. 3 in that, in place of steps 104 and 106 shown in FIG. 3, the program includes a step 204 of reading position information and IP address of MFP 220 from location information storage unit 53 and IP address storage unit 180 of MFP 220, and a step 206 of obtaining position information and IP address of communication terminal 222 through wireless I/F 235, respectively, and in that, between steps 108 and 110 of FIG. 3, the program includes a step 198 of determining whether the IP address of MFP 220 belongs to the same segment as the IP address of communication terminal 222 and proceeding to step 110 if the result of determination is YES and proceeding to step 120 if it is NO.

—Operation—

Referring to FIG. 7, MFP authentication system 218 operates as follows. GPS module 54 operates in the similar manner as in the first embodiment. The information thus obtained is stored in location information storage unit 53. DHCP client 184 operates in the similar manner as in the second embodiment. The IP address thus obtained is stored in IP address storage unit 180.

Assume that the user brings communication terminal 222 into the range of wireless I/F 235 in MFP 220 to use MFP 220. Communication starts between wireless I/F 235 and communication terminal 222, and in response, the program, of which control structure is shown in FIG. 8, is activated.

Referring to FIG. 8, at step 204, the position information and IP address of MFP 220 are read from location information storage unit 53 and IP address storage unit 180. At step 206, the user position information and IP address are read from communication terminal 222.

The obtained pieces of location information are compared with each other at step 108. If the position specified by the position information of MFP 220 is within the location specified by the position information of communication terminal 222, control proceeds to step 198.

At step 198, network masks of the IP address of MFP 220 and of the IP address of communication terminal 222 are compared. If these two do not belong to the same segment, control proceeds to step 120, and use of MFP 220 by the user is not permitted. If these two belong to the same segment, use of MFP 220 by the user is permitted. Subsequent processes are the same as those in the first embodiment.

The present embodiment attains the same effects as the first and second embodiments. In addition, when the location information of the MFP is compared with that of the user, it is possible to distinguish the floor in the present embodiment, while it is difficult in the first embodiment to distinguish one floor from another. If a user has the IP address belonging to the same segment as the MFP but his/her area is not the position where the GPS is set, use of the MFP by the user is restricted. As a result, use of the MFP can more precisely be restricted than in the first and second embodiments. Further, it is unnecessary to fully reset the user information in the MFP for restricting use by the users.

Fourth Embodiment

For more detailed management of location information such as building floors, it is possible to use information other than the IP address. For instance, it may be possible to install a transmitter transmitting an area code by weak radio wave, on each floor of a building. The location information can be managed by using the area code transmitted therefrom. In the present embodiment, the position information from the GPS and the area code provided by the wireless signal are used as the location information.

Here, the area code refers to a code allocated to each region. The area code may be formed in hierarchical manner to include a code representing a wide area to a code representing a narrow area. By way of example, the area code may be formed as information consisting of a number of bits, with upper bits specifying a wide area and lower bits specifying a narrower area.

—Structure—

Figure 9:
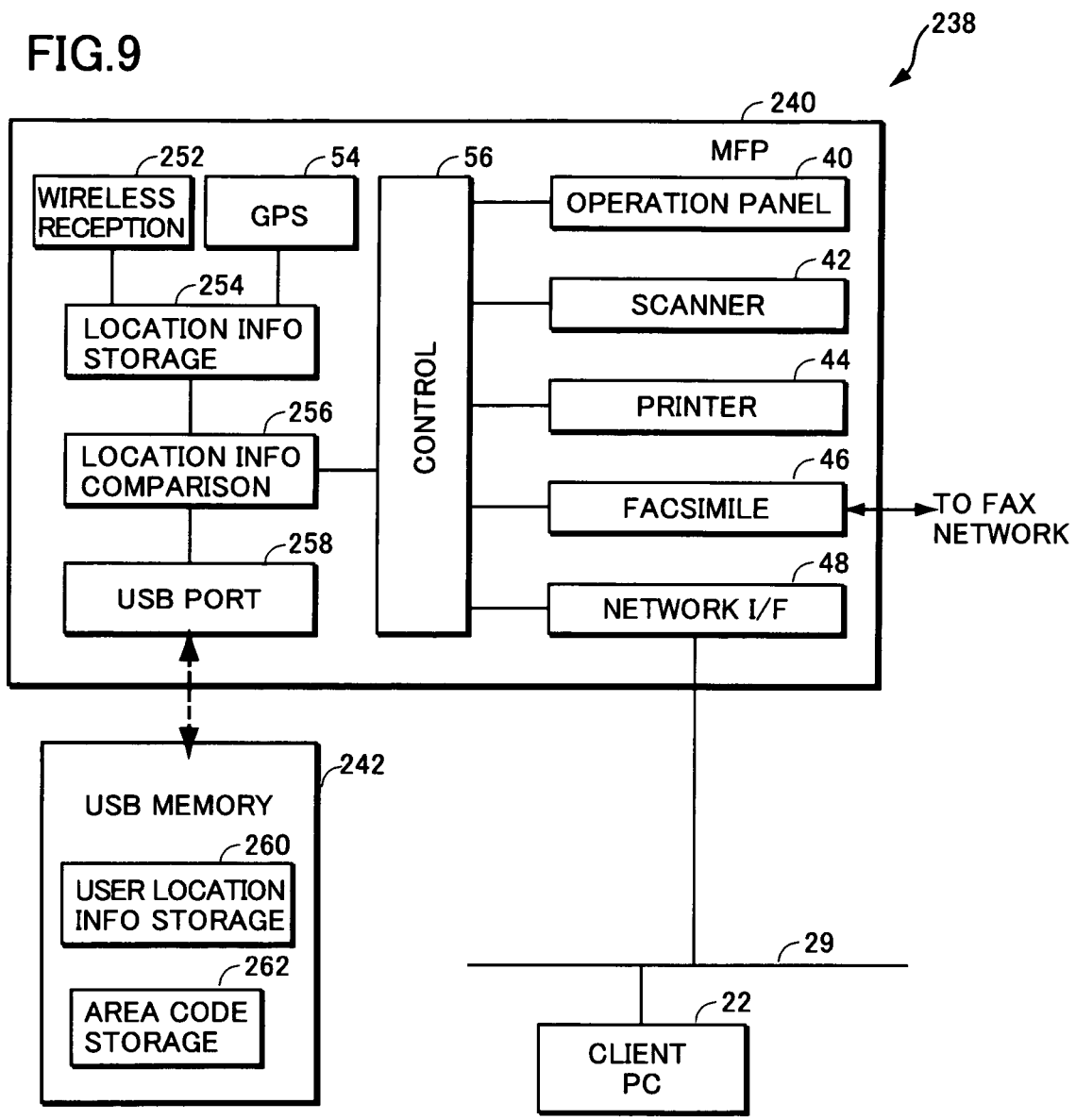
FIG. 9 is a schematic block diagram of MFP 240 in accordance with a fourth embodiment of the present invention.

FIG. 9 is a block diagram showing an outline of MFP 240 in accordance with the fourth embodiment of the present invention.

Referring to FIG. 9, MFP 240 constitutes a part of MFP authentication system 238. MFP authentication system 238 includes, in addition to MFP 240, network 29, client PC 22, and a USB (Universal Serial Bus) memory 242 that stores location information to which the user belongs, delivered by an administrator of MFP 240 to the user.

MFP 240 has a structure similar to that of MFP 30 shown in FIG. 1 and, in place of card reader 50, location information comparing module 52 and location information storage unit 53 shown in FIG. 1, it includes a USB port 258 to which a USP device such as USB memory 242 is attached, a wireless receiving unit 252 for receiving the area code from the area code transmitter installed at an appropriate location of each floor of the building, a location information storage unit 254 connected to GPS module 54 and wireless receiving unit 252 for storing the position information obtained by GPS module 54 and the area code received by wireless receiving unit 252, and a location information comparing module 256 for comparing the position information and area code stored in location information storage unit 254 with the position information and area code read from USB memory 242, and determining whether the position information and area code read from USB memory 242 satisfy a prescribed condition with the position information and area code stored in location information storage unit 254.

Control unit 56 determines whether use of MFP 240 by the user of USB memory 242 is to be permitted, based on the result of comparison by location information comparing module 256, and controls various portions of MFP 240 in accordance with the result of determination.

USB memory 242 includes a user location information storage unit 260 for storing the position information representing the place where the user belongs to, and an area code storage unit 262 for storing the area code permitted to the user.

Similar to IC card 32 of the first embodiment, USB memory 240 is delivered to the user by the administrator of MFP authentication system 238. The user position information and the area code are encrypted and written by the administrator to the user location information storage unit 260 and the area code storage unit 262, respectively, when USB memory 242 is delivered.

Figure 10:
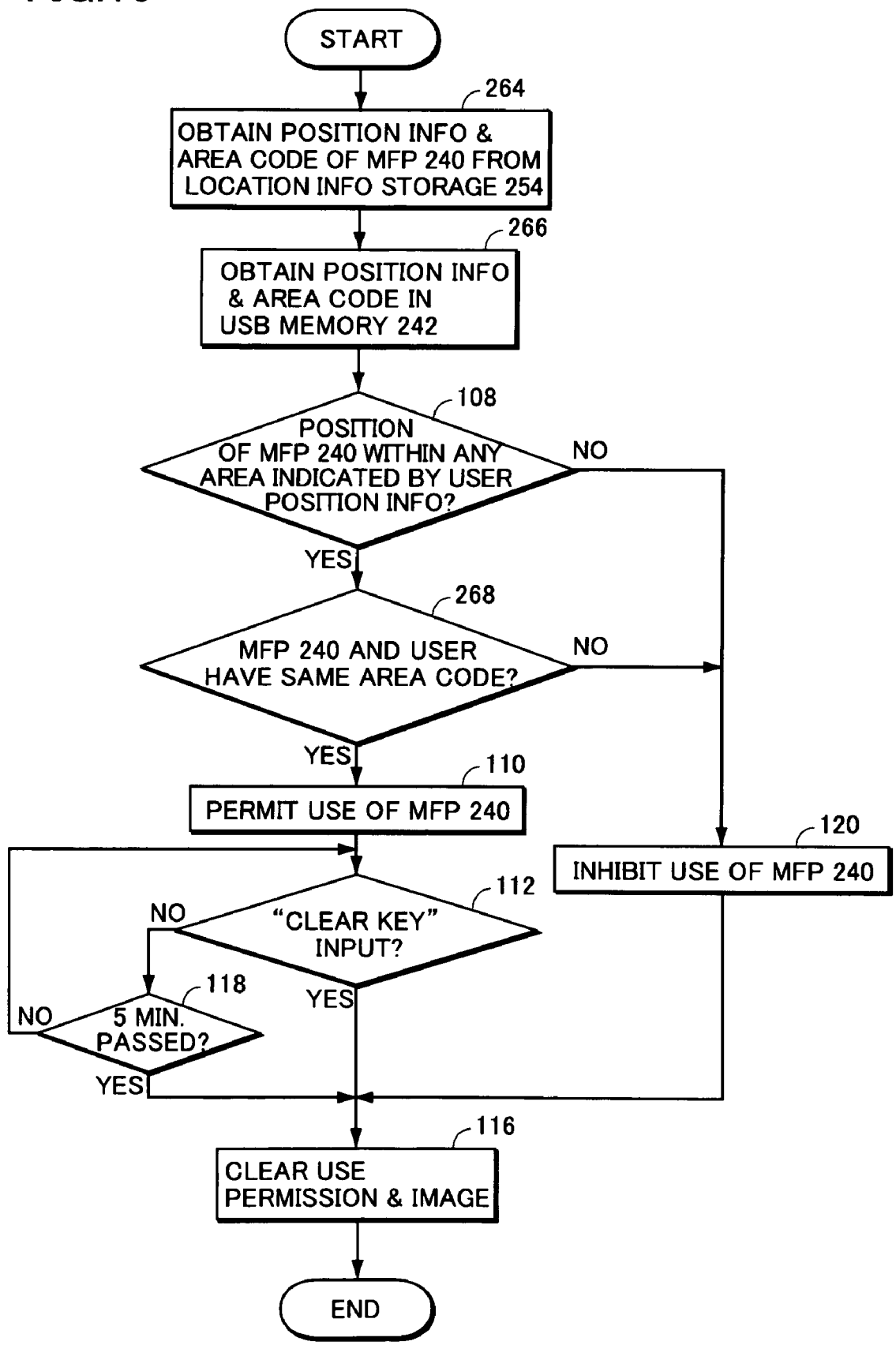
FIG. 10 is a flowchart representing a control structure of an authentication program for realizing MFP 240 shown in FIG. 9.

The functions of control unit 56 and location information comparing module 256 shown in FIG. 9 are substantially realized by a computer and an authentication program executed by the computer. FIG. 10 is a flowchart representing the control structure of the authentication program.

Referring to FIG. 10, the present program has a control structure very similar to the program of the third embodiment shown in FIG. 8. It is noted, however, that the program includes, in place of steps 204, 206 and 298 shown in FIG. 8, a step 264 of reading the position information of MFP 240 obtained by GPS module 54 and the area code of MFP 240 obtained by wireless receiving unit 252, from location information storage unit 254, and a step 266 of reading the user position information and area code from USB memory 242. The program further includes a step 268, which is performed if the result of determination at step 108 is YES, of comparing the area code of MFP 240 read at step 264 with the area code of USB memory 242 read at step 266, determining whether the area code of MFP 240 matches the area code stored in USB memory 242, or is a lower code thereof, and branching the control flow depending on the result of determination. If the result of determination at step 268 is YES, the flow proceeds to step 110, and if it is NO, the flow proceeds to step 120. Processes after steps 110 and 120 are the same as those shown in FIG. 8.

Referring to FIG. 9, MFP 240 operates as follows. GPS module 54 operates in the similar manner as in the first embodiment, and stores the obtained position information in location information storage unit 254. Wireless receiving unit 252 receives the area code transmitted from an area code transmitter in the surroundings, and stores it in location information storage unit 254.

Assume that the user has connected USB memory 242 to USB port 258. In response, the program, of which control structure is shown in FIG. 10, is activated.

Referring to FIG. 10, at step 264, the position information and area code of MFP 240 are read from location information storage unit 254. At step 266, the user position information and area code are read from USB memory 242.

Location information comparing module 256 compares, at step 108, the position information read from location information storage unit 254 with the position information read from USB memory 242, and as in the first embodiment, if the position represented by the position information of MFP 240 is within any area represented by the user position information, determination of step 268 is made. Otherwise, use of MFP 240 by the user is inhibited.

At step 268, the area code of MFP 240 is compared with the area code of the user. As a result of comparison, if the area code of MFP 240 matches the area code of the user or it is a lower code thereof, the process after step 110 is executed and use of MFP 240 by the user is permitted. Otherwise, use of MFP 240 by the user is inhibited. Subsequent processes are the same as those in the first embodiment.

By the present embodiment, the position information indicating geographical information of the place where the user belongs is stored in the USB memory and, therefore, using the GPS provided in the MFP, primary determination can be made as to whether use of MFP by the user should be permitted or restricted. Further, by using the area code, even in the region where use of an MFP by the user is permitted tentatively, use of an MFP outside of the area code allocated to the user is inhibited. Therefore, it becomes possible to realize general use control in a large region using GPS and to realize more delicate use control using the area code.

As the area code transmitter, wireless radio wave may be used, or a so-called illumination communication may be used, in which illumination from an LED (Light Emitting Diode) embedded in the ceiling or the like is modulated by the area code. In that case, a light-receiving device must be provided on the MFP.

Fifth Embodiment

In the embodiments described above, position information of latitude and longitude is used as the location information set in the user side device. The present invention, however, is not limited to such embodiments. As the information set for the user, simply a name of the regional area to which the user belongs, may be used. In the fifth embodiment, only the place name where the user belongs (such as "Osaka" and "Tokyo"; name of a city, district or smaller division may be used.) is stored in the IC card delivered to the user, and whether use of the MFP by the user is to be permitted or not is controlled on place-by-place basis.

—Structure—

Figure 11:
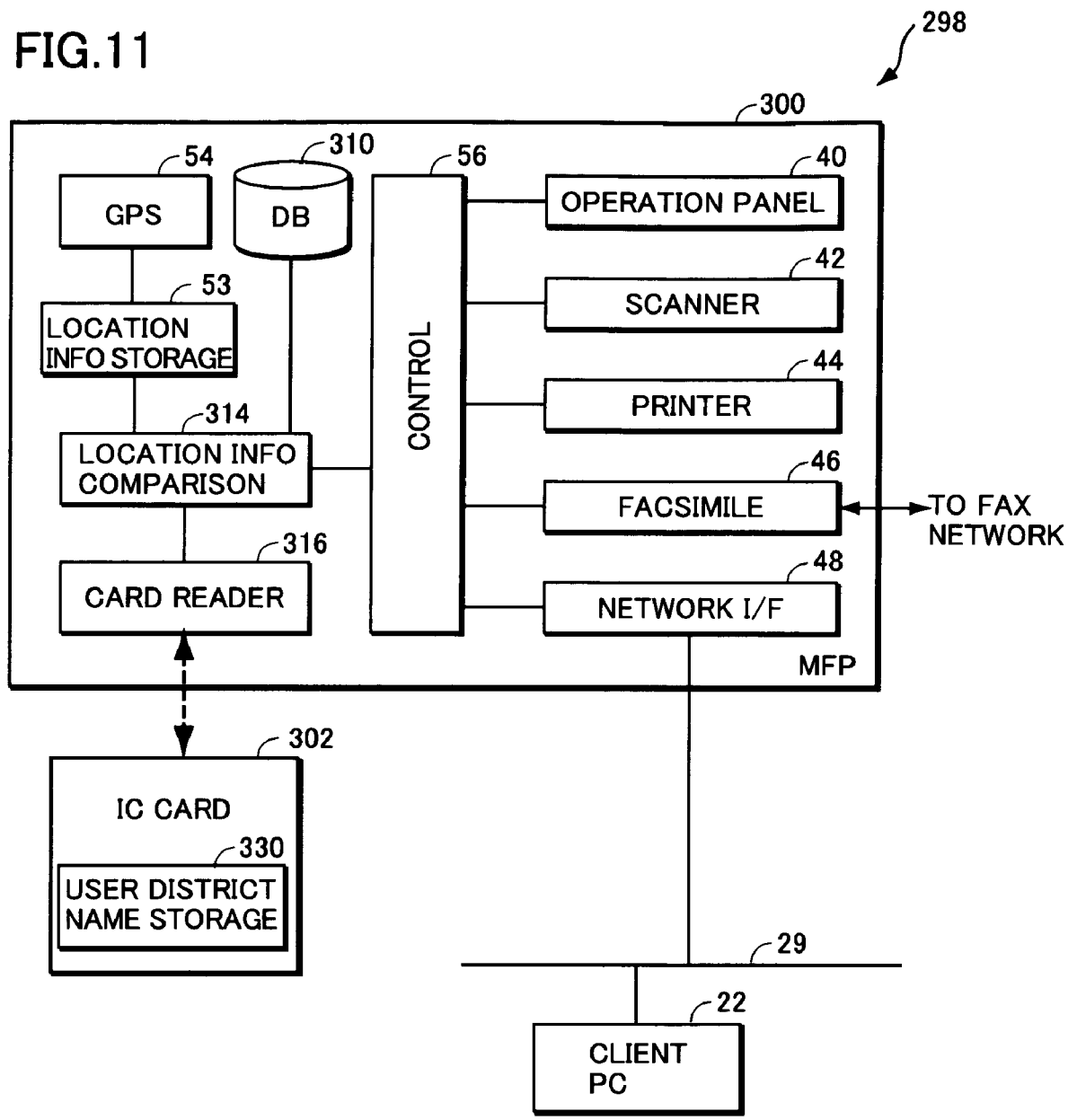
FIG. 11 is a schematic block diagram of MFP 300 in accordance with a fifth embodiment of the present invention.

FIG. 11 is a block diagram showing an outline of MFP 300 in accordance with a fifth embodiment of the present invention.

Referring to FIG. 11, MFP 300 constitutes a part of MFP authentication system 298. MFP authentication system 298 includes, similar to MFP authentication system 28, network 29, client PC 22, and an IC card 302 storing a name of a district, for example, to which the user belongs, delivered to the user.

MFP 300 has a structure similar to MFP 30 shown in FIG. 1 and, in place of card reader 50 and location information comparing module 52, it includes a card reader 316 for reading the district name from IC card 302 in a contactless communication with IC card 302, a district name database (hereinafter denoted as "DB") 310 having information specifying regions of a prescribed scope and district names corresponding to the regions related to each other in the form of a database, and a location information comparing module 314 connected to location information storage unit 53 and district name DB 310, for reading position information of MFP 300 from location information storage unit 53, checking whether the region including the position indicated by the position information exists in the district name DB 310, comparing the district name, if it exists, with the district name read from IC card 302, and determining whether the district names match with each other.

Control unit 56 determines whether use of MFP 300 by the user of IC card 302 is to be permitted or not depending on the result of comparison by location information comparing module 314, and controls various portions of MFP 300 in accordance with the result of determination.

The information stored in district name DB 310 includes, for example, position information of two spots as a set such as "latitude 34°45' north and longitude 135°27' east" and "latitude 34°40' north and longitude 135°31' east" and the corresponding district name such as "Osaka city." The position information represents a roughly defined region having the diagonal extending between the two spots as mentioned above. The district name may be any name by which the organization using the MFP 300 can identify the roughly defined region. It is often the case in a company organization that head office, branches and the like are located at geographically separate regions. Therefore, the roughly defined region may be related to a department of the company and department name such as "Osaka branch" may be used as the district name corresponding to the region.

Figure 12:
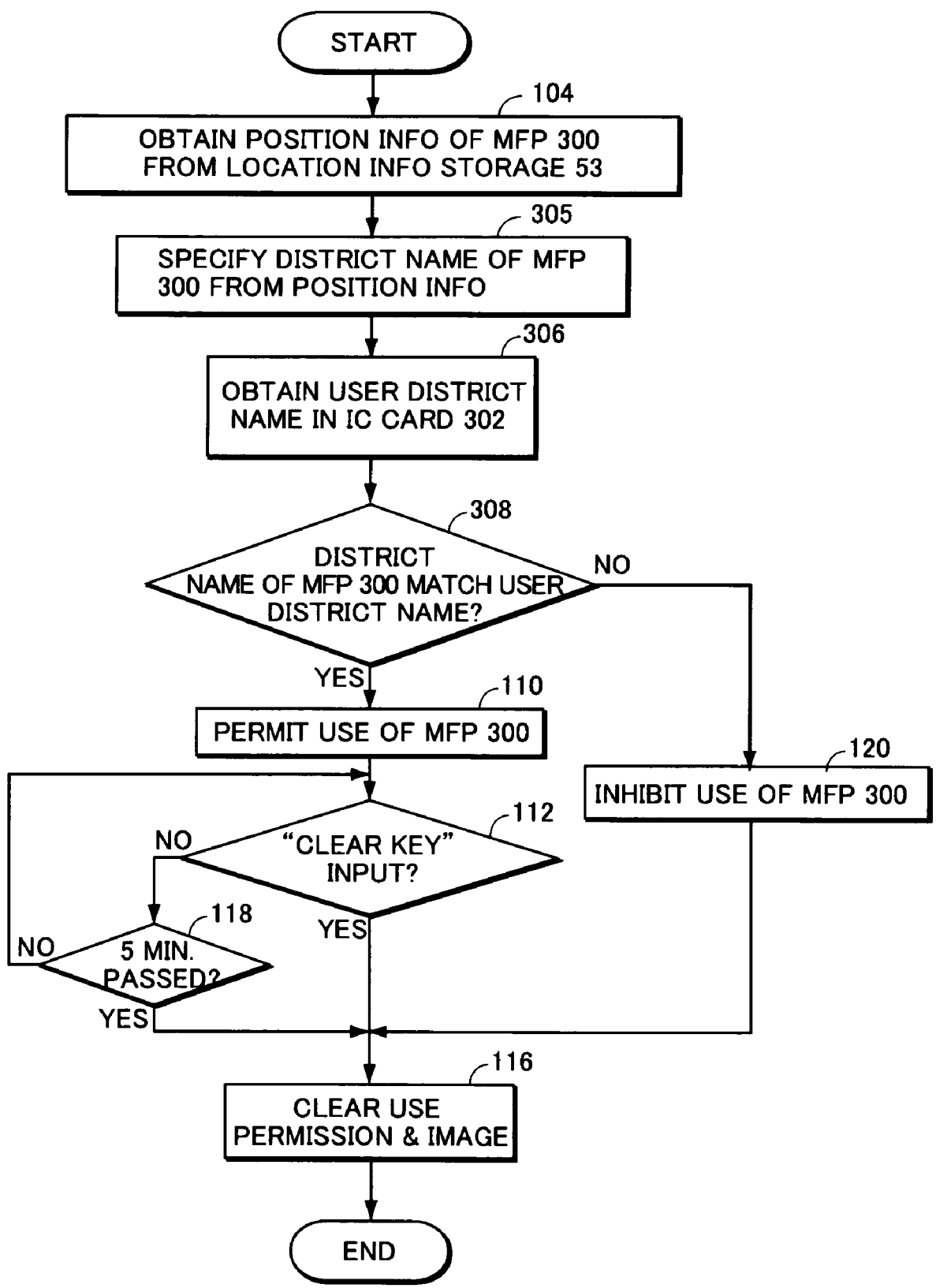
FIG. 12 is a flowchart representing a control structure of an authentication program for realizing MFP 300 shown in FIG. 11.

Of the functional blocks described above, functions of location information comparing module 314 and control unit 56 are substantially realized by a computer and an authentication program. FIG. 12 is a flowchart representing the control structure of the authentication program.

Referring to FIG. 12, the control structure of the present program is basically the same as that of the program in accordance with the first embodiment shown in FIG. 3. However, the program includes, in place of steps 106 and 108 shown in FIG. 3, a step 305 executed after step 104, of collating the position information obtained at step 104 with the district name DB 310, checking whether the region including the position information obtained at step 104 is recorded in district name DB 310 or not and if it is, obtaining the district name as a result, a step 306, following steps 305, of reading the district name from IC card 302 through card reader 316, and a step 308 of determining whether the district name obtained at step 305 matches with the district name obtained at step 306 and branching the control to step 110 if the two match, and to step 120 if not. The control structure following steps 110 and 120 is the same as that shown in FIG. 3.

—Operation—

Referring to FIGS. 11 and 12, MFP 300 in accordance with the fifth embodiment operates as follows. GPS module 54 operates in the similar manner as in the first embodiment, and stores the position information in location information storage unit 53.

Assume that the user brings the IC card 302 within the range of card reader 316. In response, the program, of which control structure is shown in FIG. 12, is activated.

Referring to FIG. 12, control unit 56 reads position information (latitude, longitude) of MFP 300 from location information storage unit 53 at step 104. At step 305, on the position information read from location information storage unit 53, control unit 56 issues an inquiry to district name DB 310 and, if a region including the latitude and longitude specified by GPS module 54 is stored in district name DB 310, reads the district name corresponding to that record. Further, at step 306, control unit 56 reads the location information (district name) of the user. The read area information is compared at step 308. Specifically, whether the district name read from district name DB 310 as the district name corresponding to the position information of MFP 300 is the same as the district name read from IC card 302 is determined. If the two are the same, at step 110, use of MFP by the user is permitted. If not, at step 120, use of MFP 300 by the user is inhibited. Subsequent operation is the same as that of the first embodiment.

Figure 13:
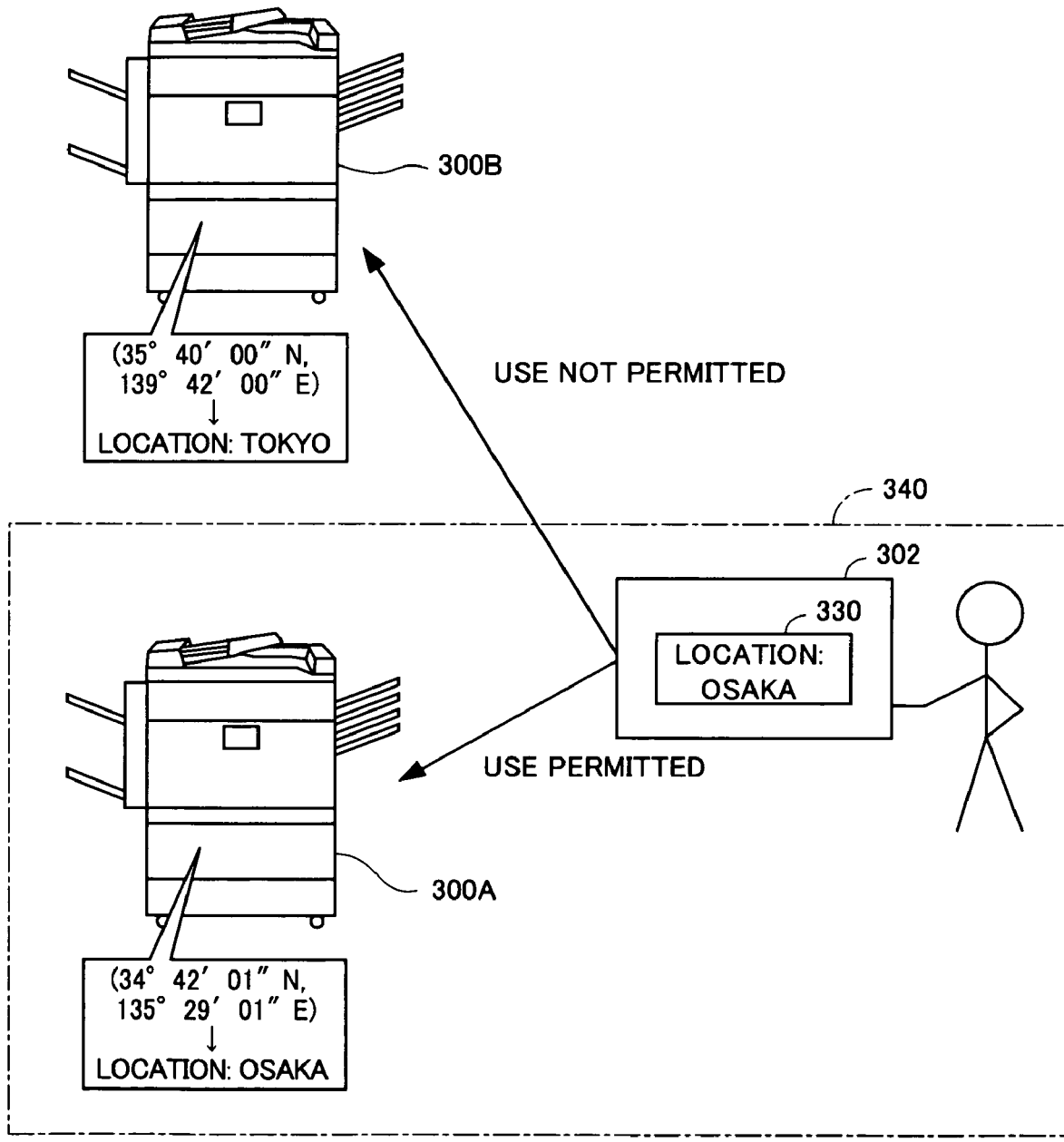
FIG. 13 shows a specific example of use of MFP authentication system 298 shown in FIG. 11.

FIG. 13 illustrates specific operation of MFP authentication system 298 in accordance with the present application. Referring to FIG. 13, assume that district name of a district to which the user belongs is "Osaka." IC card 302 delivered to the user includes a user district name storage unit 330 for storing the district name of the district to which the user belongs. In the user district name storage unit 330 of IC card 302 of the user, "Osaka" is stored as the district name.

Assume that an MFP 300A having the same structure as MFP 300 is installed in area 340. It is assumed that, specifically, area 340 is near Osaka, and the position information obtained by MFP 300A from the GPS is (latitude 34°42'01" north and longitude 135°29'01" east). The position specified by the position information is assumed to be within the area 340. Further, assume that an MFP 300B having the same structure as MFP 300 is installed somewhere in Tokyo. It is assumed that the position information obtained by MFP 300B the GPS is (latitude 35°40'00" north and longitude 139°42'00" east). Contents of district name databases DB included in MFPs 300A and 300B are the same, and include a record that establishes correspondence between the location information indicating area 340 and the district name "Osaka." Similarly, a record that establishes correspondence between the location information indicating a specific region near Tokyo and the district name "Tokyo" is in the district name DB.

Here, assume that the user moves IC card 302 within the range of card reader 316 of MFP 300A, to use MFP 300A. MFP 300A obtains the district name "Osaka" from district name DB based on the position information (latitude 34°42'01" north and longitude 135°29'01" east) obtained from the GPS through the operation described above. As the district name "Osaka" matches the district name "Osaka" obtained from IC card 302, use of MFP 300A by the user is permitted.

Assume that the same user goes to Tokyo on business and moves IC card 302 within the range of card reader of MFP 300B, to use MFP 300B. MFP 300B obtains the district name "Tokyo" from district name DB based on the position information latitude 35°40'00" north and longitude 139°42'00" east) obtained from the GPS. MFP 300B compares the district name "Tokyo" with the district name "Osaka" read from IC card 302. As the names do not match, use of MFP 300B by the user is not permitted.

As described above, in the present embodiment, as in the first to fourth embodiments, it is unnecessary to register user key numbers one by one when the MFP is replaced or updated. The same applies when the user is relocated. Further, location is registered with the IC card of the user in the form of a district name, which is easy to understand, rather than latitude and longitude that are difficult to grasp. Therefore, registration with the IC card is easy and less error prone. The district name DB can be used commonly company-wide and, therefore, only one may be formed somewhere and distributed, realizing efficient management.

[Modification]

In the embodiments of the present invention, an IC card, a communication terminal and a USB memory have been used as external devices for inputting location information of the user to the MFP. Any external device that can store information and capable of communicating with the MFP in one way or another may be used. The method of communication between the external device and the external device I/F of MFP is not specifically limited. Naturally, a device such as the IC card that allows handy communication in a contactless manner is desirable.

In the GPS used in some of the embodiments of the present invention, position information of the MFP is obtained when the MFP is powered on. The present invention, however, is not limited to such embodiments. Generally, an apparatus such as the MFP is not frequently moved and, therefore, it is unnecessary to obtain position information frequently. However, the position information may be obtained at a prescribed time interval, or the position information may be obtained every time the user operates MFP for use. Generally, it is common that the MFP is unplugged when it is moved, and the plug is inserted to the socket again after the MFP installation is complete. Therefore, it poses no problem if the GPS is operated and the position information is obtained after the plug is inserted to the MFP and main power becomes available.

Further, the location information may be manually input to the MFP, without using GPS or the like. In that case, it becomes necessary to set the position information for each MFP. The labor is far lighter than when key information of each and every user is set in the MFP.

In the embodiments described above, there may be one or more pieces of location information of the user. The present invention is not limited to such embodiments and only one location information may be stored in one card. When pieces of location information are recorded, the areas specified by the pieces of location information may not be overlapping, or may be partially overlapping In the embodiment above, location information specifying a prescribed area is recorded in an external device held by a user, and only one spot is specified by the position information of MFP, and if the MFP is within the area specified by the location information of the user, it is determined that a prescribed relation holds. The combination of the location information held by the user and the location information on the side of MFP used for the determination, however, is not limited to the one above. By way of example, both may use location information specifying prescribed area, and use may be permitted when the regions overlap at least partially. Alternatively, both may identify specific spots, and use may be permitted if the distance between the two spots is equal to or shorter than a prescribed value.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus, used with an external device capable of outputting first location information specifying a certain region, comprising:
    a first location information obtaining device obtaining said first location information from said external device;
    a second location information obtaining device obtaining second location information related to a location where said image processing apparatus is installed; and
    an authentication device connected to said first and second information obtaining devices and permitting use of said image processing apparatus if a prescribed condition indicating that locations indicated by said first location information and said second location information have a common part is satisfied, and restricting use of said image processing apparatus if not, wherein
    said second location information obtaining device includes a GPS module, and wherein
    said authentication device includes
        a determining device connected to said first and second location information obtaining devices, for determining whether a spot specified by latitude and longitude obtained by said GPS module is included in the region specified by said first location information and outputting a determination signal, and
        a control device connected to receive said determination signal, for controlling use of said image processing apparatus such that use of said image processing apparatus is permitted or restricted depending on said determination signal.

2. An image forming apparatus according to claim 1, wherein
    said first location information includes latitude and longitude information indicating a region to which said external device belongs and an IP address of said external device;
    said second location information obtaining device further includes an address obtaining device automatically obtaining and updating an IP address of said image processing apparatus; and said determining device includes a first comparator coupled to said first location information obtaining device and said GPS module, for comparing a region specified by the latitude and longitude information included in said first location information with a spot specified by latitude and longitude obtained by said GPS module, and outputting a first determination signal, and a second comparator coupled to said first location information obtaining device and said address obtaining device, for determining matching of network mask portions of the IP address included in said first location information and the IP address obtained by said address obtaining device, and outputting a second determination signal, and wherein said control device includes a device coupled to receive said first and second determination signals and permitting or restricting use of said image processing apparatus in accordance with a combination of values of said first and second determination signals.

3. The image processing apparatus according to claim 1, wherein said first location information obtaining device includes a card reader capable of contactless communication with an external IC card.

4. The image processing device according to claim 1, wherein said first location obtaining device includes a USB memory interface.

5. The image processing apparatus according to claim 1, wherein said first location information may specify a plurality of regions; and said determining device includes a comparator connected to said first and second location information obtaining devices, for comparing one or any of the plurality of regions indicated by said first location information and a location indicated by said second location information, and determining whether the compared region or region and the location overlap, and outputting a determination signal.

6. A method of authentication for an image processing apparatus used with an external device capable of outputting first location information specifying a certain region, comprising the steps of:

obtaining said first location information from said external device;

obtaining second location information related to a location where said image processing apparatus is installed; and an authentication step of receiving said first location information obtained at said step of obtaining first location information and said second location information obtained at said step of obtaining second location information, and permitting use of said image processing apparatus if a prescribed condition indicating that locations indicated by said first location information and said second location information have a common part is satisfied, and restricting use of said image processing apparatus if not, wherein said image processing apparatus includes a GPS module, said step of obtaining said second location information includes the step of obtaining latitude and longitude related to a position where said image processing apparatus exists, through said GPS module, and an authentication step includes the steps of receiving said first location information obtained at said step of obtaining first location information and said second location information obtained at the step of obtaining second location information, determining whether a spot specified by latitude and longitude obtained by said GPS module is included in the region specified by said first location information and outputting a determination signal, and receiving said determination signal and controlling use of said image processing apparatus such that use of said image processing apparatus is permitted or restricted depending on said determination signal.

7. The method of authentication for an image processing apparatus according to claim 6, wherein said first location information includes latitude and longitude information indicating a region to which said external device belongs and an IP address of said external device;

said image processing apparatus further includes an address obtaining device automatically obtaining and updating an IP address of said image processing apparatus;

said step of obtaining said second location information includes the steps of obtaining latitude and longitude of a position where said image processing apparatus exists, through said GPS module, and said authentication step includes the steps of receiving results of said step of obtaining said first location information and said step of obtaining latitude and longitude, comparing the region specified by the latitude and longitude included in said first location information and a spot specified by the latitude and longitude obtained by said GPS n module, and outputting a first determination signal, receiving results of said step of obtaining said first location information and said step of obtaining said IP address, determining matching of network mask portions of the IP address included in said first location information and the IP address obtained at said step of obtaining said IP address, and outputting a second determination signal, and receiving said first and second determination signals, and permitting or restricting use of said image processing apparatus in accordance with combination values of said first and second determination signals.

8. The method of authentication for an image processing apparatus according to claim 6, wherein a first location information may specify a plurality of regions; and said authentication step includes the steps of receiving results of said step of obtaining said first location information and said step of obtaining said second location information, comparing one or any of the plurality of locations indicated by said first location information and said second location information and outputting a determination signal, and receiving said determination signal, and permitting or restricting use of said image processing apparatus depending on a value of said determination signal.

9. A non-transitory recording media recording a computer program, wherein said computer program causes, when executed by a computer, said computer to execute a method of authentication for an image processing apparatus used with an external device capable of outputting first location information specifying a certain region, comprising the steps of:

obtaining said first location information from said external device;

obtaining second location information related to a location where said image processing apparatus is installed; and an authentication step of receiving said first location information obtained at said step of obtaining first location information and said second location information obtained at said step of obtaining second location information, and permitting use of said image processing apparatus if a prescribed condition indicating that locations indicated by said first location information and said second location information have a common part is satisfied, and restricting use of said image processing apparatus if not, wherein said image processing apparatus includes a GPS module, said step of obtaining said second location information includes the step of obtaining latitude and longitude related to a position where said image processing apparatus exists, through said GPS module, and an authentication step includes the steps of receiving said first location information obtained at said step of obtaining first location information and said second location information obtained at the step of obtaining second location information, determining whether a spot specified by latitude and longitude obtained by said GPS module is included in the region specified by said first location information and outputting a determination signal, and receiving said determination signal and controlling use of said image processing apparatus such that use of said image processing apparatus is permitted or restricted depending on said determination signal.

\* \* \* \* \*